(12) United States Patent
Yokoo et al.

(10) Patent No.: US 8,303,451 B2
(45) Date of Patent: Nov. 6, 2012

(54) DRIVING FORCE DISTRIBUTION MECHANISM

(75) Inventors: Takami Yokoo, Nishikamo-gun (JP); Shin Kurosaki, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 297 days.

(21) Appl. No.: 12/676,028

(22) PCT Filed: Sep. 10, 2008

(86) PCT No.: PCT/IB2008/002865
§ 371 (c)(1),
(2), (4) Date: Mar. 2, 2010

(87) PCT Pub. No.: WO2009/034471
PCT Pub. Date: Mar. 19, 2009

(65) Prior Publication Data
US 2010/0203999 A1    Aug. 12, 2010

(30) Foreign Application Priority Data

Sep. 10, 2007  (JP) .................. 2007-233684
Oct. 31, 2007  (JP) .................. 2007-283275

(51) Int. Cl.
*F16H 48/06* (2006.01)
*B62D 11/06* (2006.01)
(52) U.S. Cl. .................. 475/231; 475/30
(58) Field of Classification Search .............. 475/18, 475/28, 29, 30, 225, 230, 231
See application file for complete search history.

(56) References Cited

U.S. PATENT DOCUMENTS

| 4,973,296 A | 11/1990 | Shibahata |
| 6,056,660 A * | 5/2000 | Mimura .................. 475/205 |
| 2006/0172846 A1 | 8/2006 | Gassmann et al. |
| 2007/0259749 A1 | 11/2007 | Ross |
| 2007/0259751 A1 | 11/2007 | Ross et al. |

FOREIGN PATENT DOCUMENTS

| DE | 3900638 C2 | 7/1989 |
| DE | 102007020356 A1 | 11/2007 |

(Continued)

OTHER PUBLICATIONS

German Office Action issued on Jun. 9, 2011 in DE 11 2008 002 420.0.

*Primary Examiner* — Justin Holmes
*Assistant Examiner* — Colby M Hansen
(74) *Attorney, Agent, or Firm* — Sughrue Mion, PLLC

(57) ABSTRACT

A driving force distribution device for distributing driving force from an engine to left and right rear wheels has: a differential case which accommodates a differential mechanism therein; an intermediate shaft which is provided parallel to an output shaft extending leftward or rightward from the differential mechanism; a speed-up mechanism which is provided to the left or right of the differential case and changes and transmits driving force input to the differential case to the output shaft via the intermediate shaft; and a clutch mechanism capable of switching between a transmitting state in which the speed-up mechanism transmits the driving force to the output shaft and a blocking state in which the transmission of the driving force is blocked. According to the driving force distribution device, cost reduction and downsizing of the driving force distribution mechanism and a housing thereof can be realized.

14 Claims, 7 Drawing Sheets

FOREIGN PATENT DOCUMENTS

| | | |
|---|---|---|
| EP | 0 844 416 A2 | 5/1998 |
| JP | 07-108842 A | 4/1995 |
| JP | 2641724 B2 | 5/1997 |
| JP | 10138787 A | 5/1998 |
| JP | 10-157483 A | 6/1998 |
| JP | 3103779 B2 | 8/2000 |
| WO | 2006/114331 A1 | 11/2006 |
| WO | 2007/068471 A2 | 6/2007 |

* cited by examiner

DRIVING FORCE DISTRIBUTION MECHANISM

INCORPORATION BY REFERENCE

The disclosure of Japanese Patent Applications No. 2007-233684 filed on Sep. 10, 2007 and No. 2007-283275 filed on Oct. 31, 2007, including the specifications, drawings and abstracts are incorporated herein by reference in their entireties.

BACKGROUND OF THE INVENTION

1. Field of the Invention

This invention relates to a driving force distribution mechanism for a vehicle which distributes a driving force from a driving source to left and right driving wheels.

2. Description of the Related Art

Japanese Patent No. 2641724, for example, describes a conventional driving force distribution mechanism for a vehicle, which distributes and transmits driving force of a driving source, such as an engine changed in speed through a transmission, to left and right driving wheels (left and right wheels). Specifically, this patent literature discloses a driving force distribution mechanism that has a mechanical differential device, left and right clutches capable of transmitting torque to left and right wheels respectively, and left and right transmission mechanisms (speed-up mechanisms).

This driving force distribution mechanism described in Japanese Patent No. 2641724 is designed such that the left and right wheels are driven by the mechanical differential device in a state in which the left and right clutches are disengaged. Also, one of the driving wheels can be rotated faster than the other driving wheel by bringing one of the left and right clutches into engagement and the other in disengagement.

However, the driving force distribution mechanism described in Japanese Patent No. 2641724 is configured such that the left and right clutches and the change gears of the left and right transmission mechanisms are disposed on a single intermediate shaft provided parallel to an output shaft. Use of both the right side and the left side of the intermediate shaft as describe above brings out the problem of an increase in size of the driving force distribution mechanism and size of a housing accommodating the driving force distribution mechanism, which leads to an increase in weight thereof and a deterioration in mountability.

Moreover, as a technology for performing left-right wheel torque difference control by using a differential mechanism of an existing final reduction device, driving force distribution mechanisms described in, for example, Japanese Patent No. 3103779, International Publication WO2006/114331 and the like. However, because a plurality of planetary gear mechanisms are used as speed-up mechanisms in the driving force distribution mechanism described in Japanese Patent No. 3103779, the problems of this driving force distribution mechanism are that an extremely large number of parts are required and it is extremely difficult to produce this driving force distribution mechanism, which leads to a significant increase in the production cost. In the driving force distribution mechanism described in International Publication WO2006/114331, on the other hand, internal gears in complicated shapes are used as the speed-up gears; which brings out the problems of a complicated structure for supporting these gears and a significant increase in the production cost.

SUMMARY OF THE INVENTION

This invention has been contrived in view of the above points, and is intended to provide a driving force distribution mechanism capable of reducing the production cost, the size of the driving force distribution mechanism, and the size of a housing surrounding the driving force distribution mechanism.

One aspect of this invention provides a driving force distribution mechanism for distributing driving force from a driving source to left and right driving wheels. The driving force distribution mechanism has: a differential case which accommodates a differential mechanism therein; a first intermediate shaft which is provided parallel to a left output shaft extending leftward from the differential mechanism; a first transmission mechanism which is provided to the left of the differential case and changes and transmits driving force input to the differential case to the left output shaft via the first intermediate shaft; a first clutch mechanism which is capable of switching between a transmitting state in which the first transmission mechanism transmits the driving force to the left output shaft and a blocking state in which the transmission of the driving force is blocked; a second intermediate shaft which is provided parallel to a right output shaft extending rightward from the differential mechanism; a second transmission mechanism which is provided to the right of the differential case and changes and transmits the driving force input to the differential case to the right output shaft via the second intermediate shaft; and a second clutch mechanism which is capable of switching between a transmitting state in which the second transmission mechanism transmits the driving force to the right output shaft and a blocking state in which the transmission of the driving force is blocked.

According to the above configuration, compared with the case where the first intermediate shaft and the second intermediate shaft are used together, the first intermediate shaft and the second intermediate shaft can be disposed highly flexibly by providing the first intermediate shaft and the second intermediate shaft separately, and accordingly the size of the driving force distribution mechanism and the size of the housing surrounding this driving force distribution mechanism can be reduced. As a result, the increase in weight of the driving force distribution mechanism and the deterioration in mountability can be prevented. For example, by providing the first intermediate shaft and the second intermediate shaft on the left side and the right side respectively, an input shaft of the driving force distribution mechanism and the like can be disposed in the space between the first intermediate shaft and the second intermediate shaft, which contributes to reduction of the size of the driving force distribution mechanism and the size of the housing thereof. Moreover, cost reduction can be achieved and a structure for supporting the transmission mechanisms can be simplified because the transmission mechanisms can be each configured using external gears of simple construction, such as helical gears and spur gears.

Furthermore, in the driving force distribution mechanism, the first intermediate shaft is configured by a first intermediate driving shaft and a first intermediate driven shaft, the first clutch mechanism is disposed between the first intermediate driving shaft and the first intermediate driven shaft, the second intermediate shaft is configured by a second intermediate driving shaft and a second intermediate driven shaft, and the second clutch mechanism is disposed between the second intermediate driving shaft and the second intermediate driven shaft.

According to the driving force distribution mechanism described above, the first intermediate shaft and the second intermediate shaft can be disposed highly flexibly, and accordingly the size of the driving force distribution mechanism and the size of the housing surrounding this driving force distribution mechanism can be reduced, as described above. Therefore, the increase in weight of the driving force distribution mechanism and the deterioration in mountability can be prevented.

Moreover, the first intermediate shaft is preferably an integrated shaft, an end of which is disposed with the first clutch mechanism, and the second intermediate shaft is preferably an integrated shaft, an end of which is disposed with the second clutch mechanism.

In this case as well, the first intermediate shaft and the second intermediate shaft can be disposed highly flexibly, and accordingly the size of the driving force distribution mechanism and the size of the housing surrounding this driving force distribution mechanism can be reduced, as described above. Therefore, the increase in weight of the driving force distribution mechanism and the deterioration in mountability can be prevented.

In addition, it is preferred that the driving force distribution mechanism further have a differential limiting mechanism which is provided in at least either one of the left output shaft and the right output shaft and can be engaged with the differential case. In this manner, the differential limiting mechanism can perform differential limiting control while the driving force distribution mechanism performs driving force distribution control.

The driving force distribution mechanism is configured such that the differential limiting mechanism is disposed in a position where it overlaps with the first clutch mechanism or the second clutch mechanism, as viewed from a direction along a longitudinal direction of a vehicle. Specifically, it is preferred that the differential limiting mechanism and the first clutch mechanism or the second clutch mechanism be arranged longitudinally. In this manner, the driving force distribution mechanism and the housing thereof can be prevented from being enlarged in a vehicle width direction and, as a result, the increase in weight of the driving force distribution mechanism and the deterioration in mountability can be prevented.

Furthermore, the driving force distribution mechanism is configured such that the differential limiting mechanism is disposed in a position where it is offset from the first clutch mechanism and the second clutch mechanism, as viewed from a direction along a longitudinal direction of a vehicle. Specifically, the driving force distribution mechanism is configured such that the differential limiting mechanism does not overlap with the first clutch mechanism and the second clutch mechanism as viewed from a direction along a longitudinal direction of a vehicle. In this manner, a larger differential limiting mechanism can be installed, and significant engagement capacity of the differential limiting mechanism can be secured easily. As a result, larger differential limiting force can be secured easily.

Now, the following two aspects can be raised as the specific configurations of the first transmission mechanism and the second transmission mechanism of the driving force distribution mechanism of this invention.

(1) An aspect in which the first transmission mechanism is configured by a speed-up mechanism which transmits the driving force from the differential case to the left output shaft via the first intermediate shaft, and the second transmission mechanism is configured by a speed-up mechanism which transmits the driving force from the differential case to the right output shaft via the second intermediate shaft. These speed-up mechanisms can be configured using gears, a combination of a chain and a sprocket, a combination of a belt and a pulley, or the like.

(2) An aspect in which the first transmission mechanism is configured by a reduction mechanism which transmits the driving force from the differential case to the left output shaft via the first intermediate shaft, and the second transmission mechanism is configured by a reduction mechanism which transmits the driving force from the differential case to the right output shaft via the second intermediate shaft. These reduction mechanisms can be configured using gears, a combination of a chain and a sprocket, a combination of a belt and a pulley, or the like.

According to this invention, compared with the case where the first intermediate shaft and the second intermediate shaft are used together, the first intermediate shaft and the second intermediate shaft can be disposed highly flexibly by providing the first intermediate shaft and the second intermediate shaft separately, and accordingly the size of the driving force distribution mechanism and the size of the housing surrounding this driving force distribution mechanism can be reduced. As a result, the increase in weight of the driving force distribution mechanism and the deterioration in mountability can be prevented. Moreover, cost reduction can be achieved and a structure for supporting the transmission mechanisms can be simplified because the transmission mechanisms can be each configured using external gears of simple construction, such as helical gears and spur gears.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Example embodiments of the present invention will be described in greater detail below with reference to the accompanying drawings.

Figure 1:
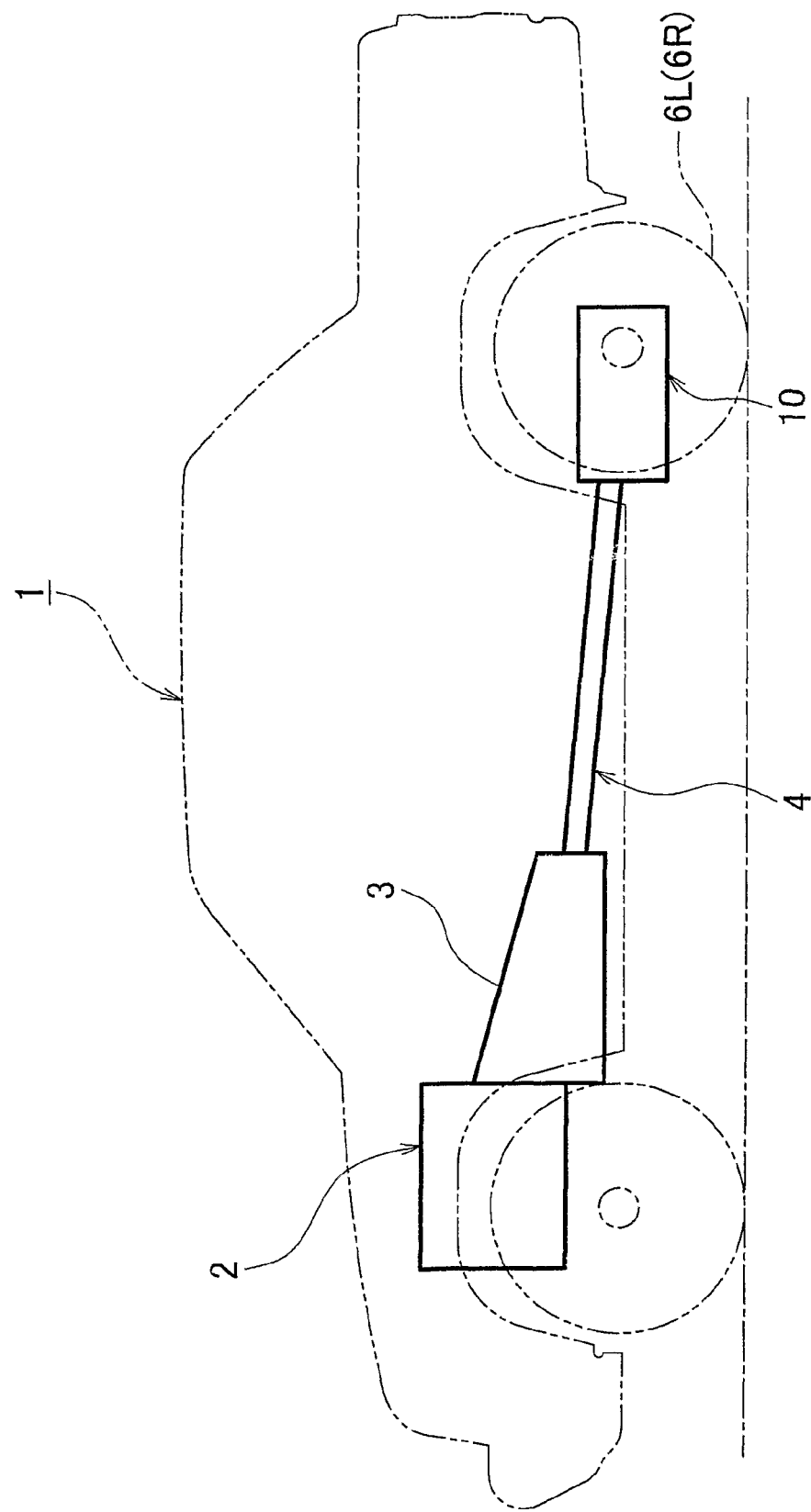
FIG. 1 is a schematic diagram showing a vehicle in which is mounted a driving force distribution mechanism according to the present embodiment.
Figure 2:
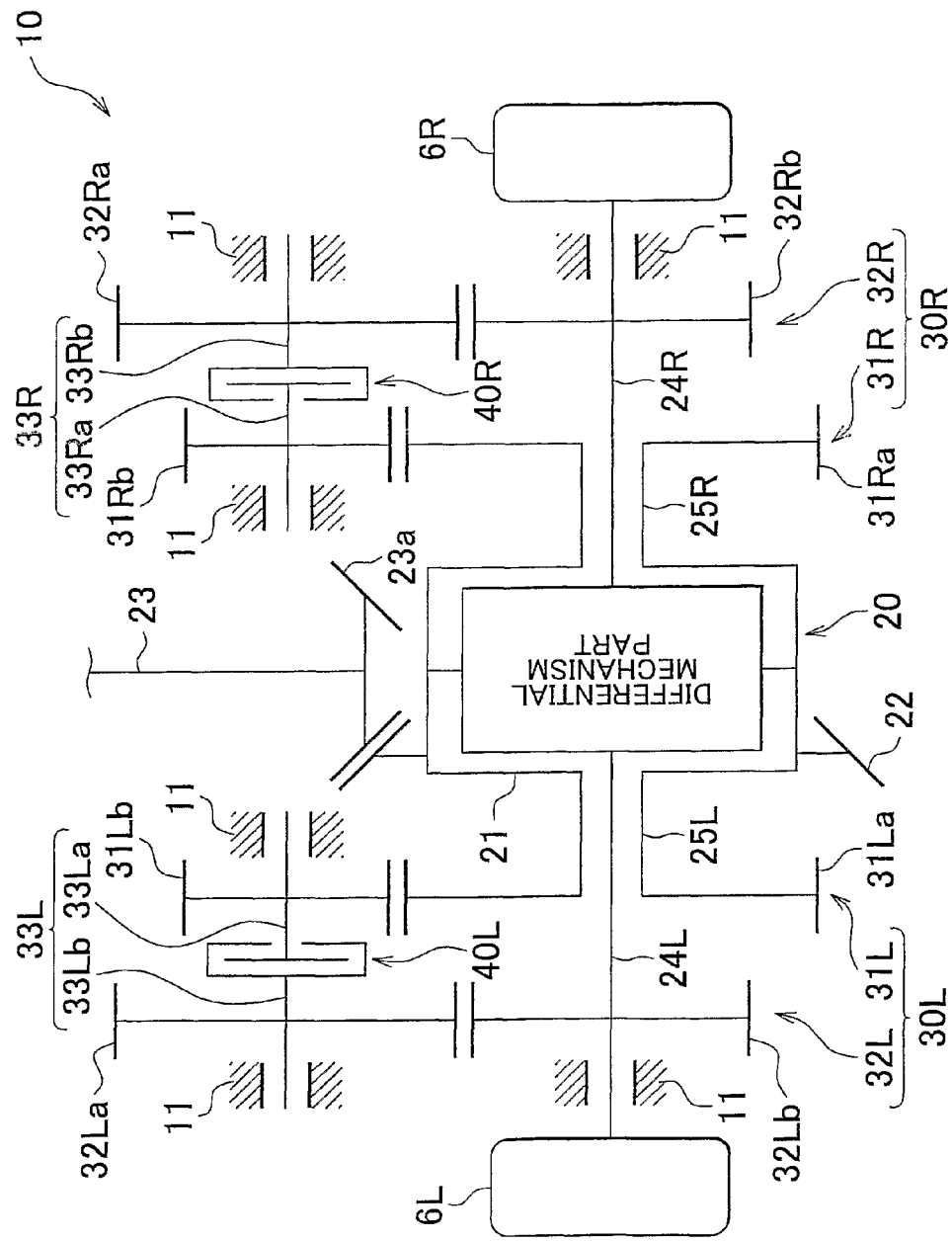
FIG. 2 is a skeleton diagram showing the driving force distribution mechanism according to the present embodiment.

FIG. 1 is a schematic diagram showing a vehicle in which is mounted a driving force distribution mechanism according to the present embodiment. This schematic diagram illustrates a front-engine rear-drive (FR) vehicle. FIG. 2 is a skeleton diagram showing the driving force distribution mechanism according to an embodiment.

In a vehicle 1, as shown in FIGS. 1 and 2, rotary driving force that is generated in an engine 2, a driving source, is changed appropriately by a transmission (e.g., automatic transmission) 3, and is then input to a driving force distribution device 10 via a propeller shaft 4 and an input shaft 23. The driving force that is input to the driving force distribution device 10 is distributed at an appropriate rate in accordance with the traveling condition of the vehicle 1, and transmitted to left and right rear wheels 6L, 6R which are driving wheels.

The driving force distribution device 10 has a differential mechanism part 20, left and right speed-up mechanisms 30L, 30R and left and right torque distribution clutch mechanisms (referred to as "clutch mechanisms" hereinafter) 40L, 40R.

The differential mechanism part 20 has a hollow box-shaped differential case 21. The differential case 21 accommodates a differential mechanism therein. The differential mechanism may have any configuration as long as it can perform a differential operation for differentially distributing driving force to left and right output shafts 24L, 24R. For example, it is possible to adopt a so-called double-pinion type differential mechanism that has a pair of pinion gears and a pair of side gears which rotate in mesh with each other.

An outer periphery of the differential case 21 is provided integrally with a ring gear 22. The ring gear 22 is meshed with a drive pinion gear 23a of the input shaft 23 (drive pinion shaft). The input shaft 23 is coupled to the propeller shaft 4, which extends from the transmission 3 side, via a joint or the like. The rotary driving force of the engine 2 is input to the ring gear 22 via the propeller shaft 4 and the input shaft 23.

From the differential mechanism accommodated in the differential case 21, the output shaft 24L extends leftward while the output shaft 24R extends rightward. A left end of the left output shaft 24L and a right end of the right output shaft 24R are supported rotatably in the housing 11 via bearings, not shown, the housing 11 surrounding the driving force distribution device 10. The left end of the output shaft 24L that is projected leftward from the housing 11 is coupled to the left rear wheel 6L, while the right end of the output shaft 24R that is projected rightward from the housing 11 is coupled to the right rear wheel 6R. Note that FIG. 2 shows a part of the housing 11 only.

The differential case 21 is further provided integrally with a hollow shaft 25L extending parallel to the output shaft 24L and a hollow shaft 25R extending parallel to the output shaft 24R. A right end of the output shaft 24L is inserted into the left hollow shaft 25L. Similarly, a left end of the output shaft 24R is inserted into the right hollow shaft 25R.

The left and right speed-up mechanisms 30L, 30R are disposed to the left and right sides of the differential mechanism part 20. In this embodiment, the speed-up mechanisms are adopted as transmission mechanisms. The left and right speed-up mechanisms 30L, 30R have the same configuration. Here, the left speed-up mechanism 30L is mainly described but the description of the right speed-up mechanism 30R is omitted.

The speed-up mechanism 30L has a pair of speed-up gear trains 31L, 32L for transmitting the driving force from the differential case 21 to the output shaft 24L via an intermediate shaft 33L.

The speed-up gear train 31L is configured by a drive gear 31La and a driven gear 31Lb that are meshed with each other. The drive gear 31La has a larger diameter than the driven gear 31Lb and a gear ratio of the speed-up gear train 31L (the number of teeth of the drive gear 31La/the number of teeth of the driven gear 31Lb) is set higher than 1. With this speed-up gear train 31L, the driving force is transmitted from the differential case 21 at a predetermined speed-up ratio (gear ratio) upon engagement of the clutch mechanism 40L described hereinafter.

The speed-up gear train 32L is configured by a drive gear 32La and a driven gear 32Lb that are meshed with each other. The drive gear 32La has a larger diameter than the driven gear 32Lb and a gear ratio of the speed-up gear train 32L (the number of teeth of the drive gear 32La/the number of teeth of the driven gear 32Lb) is set higher than 1. With this speed-up gear train 32L, the driving force is transmitted from the speed-up gear train 31L at a predetermined speed-up ratio (gear ratio) upon engagement of the clutch mechanism 40L described hereinafter.

The drive gear 31La of the speed-up gear train 31L is provided above the hollow shaft 25L. The driven gear 32Lb of the speed-up gear train 32L is provided above the output shaft 24L. The driven gear 31Lb of the speed-up gear train 31L and the drive gear 32La of the speed-up gear train 32L are provided above the intermediate shaft (countershaft) 33L extending parallel to the output shaft 24L (hollow shaft 25L). The intermediate shaft 33L is disposed in front of the output shaft 24L.

In this embodiment, the intermediate shaft 33L is divided into an intermediate driving shaft 33La and an intermediate driven shaft 33Lb. The driven gear 31Lb of the speed-up gear train 31L is provided above the intermediate driving shaft 33La, while the drive gear 32La of the speed-up gear train 32L is provided above the intermediate driven shaft 33Lb. A right end of the intermediate driving shaft 33La and a left end of the intermediate driven shaft 33Lb are supported rotatably in the housing 11 via bearings, not shown. Also, the clutch mechanism 40L described hereinafter is interposed between a left end of the intermediate driving shaft 33La and a right end of the intermediate driven shaft 33Lb.

The left and right clutch mechanisms 40L, 40R are provided in order to switch between a transmitting state in which the driving force is transmitted from the differential case 21 to the output shafts 24L, 24R via the speed-up mechanisms 30L, 30R, and a non-transmitting state (blocking state) in which the driving force is not transmitted via the speed-up mechanisms 30L, 30R. In other words, the clutch mechanisms 40L, 40R are provided in order to switch between a transmitting state for establishing a transmission path for the driving force in the speed-up mechanisms 30L, 30R, and a blocking state for inhibiting the establishment of such a transmission path. The left and right clutch mechanisms 40L, 40R have the same configuration. Here, the left clutch mechanism 40L is mainly described but the description of the right clutch mechanism 40R is omitted.

The clutch mechanism 40L is disposed between the left end of the intermediate driving shaft 33La and the right end of the intermediate driven shaft 33Lb. The clutch mechanism 40L may have any configuration as long as it is capable of switching between transmission/non-transmission states for transmitting/not transmitting the driving force from the intermediate driving shaft 33La to the intermediate driven shaft 33Lb. For example, a hydraulic clutch or the like can be used as the clutch mechanism 40L. When the clutch mechanism 40L is a hydraulic clutch, engagement/disengagement control is carried out based on hydraulic control performed through a hydraulic circuit or the like. Moreover, electrically controlled coupling or the like may be used as the clutch mechanism 40L.

Specifically, when the clutch mechanism 40L enters a disengaged state, the transmission of the driving force from the intermediate driving shaft 33La to the intermediate driven shaft 33Lb is blocked. As a result, the speed-up mechanism 30L enters the blocking state and thereby the transmission of the driving force via the speed-up mechanism 30L is blocked.

On the other hand, when the clutch mechanism 40L enters an engaged state, the driving force can be transmitted from the intermediate driving shaft 33La to the intermediate driven shaft 33Lb. As a result, the speed-up mechanism 30L enters the transmitting state and thereby the transmission of the driving force via the speed-up mechanism 30L can be realized. In other words, the transmission path for the driving force is established in the speed-up mechanism 30L. In this embodiment, upon engagement of the clutch mechanism 40L, the driving force that is transmitted from the intermediate driving shaft 33La to the intermediate driven shaft 33Lb can be adjusted by controlling the level of engagement (engagement capacity) of the clutch mechanism 40L. Specifically, the driving force to be transmitted can be set arbitrarily by controlling the clutch mechanism 40L between the engaged state and disengaged state. For example, when the clutch mechanism 40L is a hydraulic clutch, the level of engagement of this clutch is subjected to hydraulic control.

Note that the left and right intermediate shafts 33L, 33R do not have be divided but may be integrated. IN this case, the left and right clutch mechanisms 40L, 40R can be disposed in any positions above the left and right intermediate shafts 33L, 33R. For example, as in a driving force distribution device 10" described hereinafter (see FIG. 4), the left clutch mechanism 40L can be provided in the left end of the left intermediate shaft 33L and the right clutch mechanism 40R can be provided in the right end of the right intermediate shaft 33R.

The operations of the driving force distribution device 10 having the above configuration are described next. First of all, in the case where the clutch mechanisms 40L, 40R are both in the disengaged state, the driving force distribution device 10 distributes the driving force evenly to the left and right rear wheels 6L, 6R. Specifically, when the driving force is input from the propeller shaft 4 to the input shaft 23, the differential case 21 that is rotatably integrated with the ring gear 22 is rotated and thereby the left and right output shafts 24L, 24R are driven to rotate. In this case, when the vehicle 1 travels straight or the left and right rear wheels 6L, 6R have the same rotational resistances, the differential operation is not performed by the differential mechanism part 20 and thus the left and right rear wheels 6L, 6R are driven at the same rotation speed. Moreover, when the vehicle 1 travels through a curve (travels in circular motion) or a difference in rotational resistance occurs between the left and right rear wheels 6L, 6R, the differential operation is performed by the differential mechanism part 20 based on this rotational resistance difference. Consequently, the rotation speed of the rear wheel 6L (6R) having a large rotational resistance decreases, while the rotation speed of the other rear wheel 6R (6L) having a small rotational resistance increases.

Next is described the operations of the driving force distribution device 10 that are carried out when the clutch mechanism 40L is in the engaged state and the clutch mechanism 40R in the disengaged state. Because the speed-up mechanism 30L enters the transmitting state due to the engagement of the clutch mechanism 40L, the rotation speed of the output shaft 24L increases. At this moment, drive torque flows from the driven gear 32Lb to the output shaft 24L as the driven gear 32Lb increases its rotation speed, thereby increasing drive torque to be transmitted to the rear wheel 6L. In other words, the drive torque to be transmitted to the rear wheel 6L can be incremented by bringing the clutch mechanism 40L into the engaged state. In this case, the drive torque to be transmitted to the rear wheel 6R is reduced by the amount of drive torque added to the drive torque of the rear wheel 6L.

Therefore, a greater drive torque can be transmitted to the left rear wheel 6L than to the right rear wheel 6R by bringing the clutch mechanism 40L into engagement. The drive torque that is added to the drive torque of the rear wheel 6L can be set arbitrarily by controlling the engagement capacity of the clutch mechanism 40L, regardless of the magnitude of input torque transmitted to the differential case 21. Specifically, the drive torque to be added to the drive torque of the rear wheel 6L can be adjusted by appropriately setting the engagement capacity of the clutch mechanism 40L between the disengaged state (in which the level of engagement is 0%) and a completely engaged state (in which the level of engagement is 100%). As a result, the drive torque distribution ratio between the left and right rear wheels 6L, 6R can be controlled.

Similarly, when the clutch mechanism 40R is in the engaged state and the clutch mechanism 40L in the disengaged state, the drive torque to be transmitted to the rear wheel 6R is incremented in response to the engagement of the clutch mechanism 40R. In this case, the drive torque to be transmitted to the rear wheel 6L is reduced by the amount of drive torque added to the drive torque of the rear wheel 6R. Specifically, a greater drive torque can be transmitted to the right rear wheel 6R than to the left rear wheel 6L by bringing the clutch mechanism 40R into engagement. Then, the drive torque that is added to the drive torque of the rear wheel 6R can be set arbitrarily by controlling the engagement capacity of the clutch mechanism 40R, regardless of the magnitude of input torque transmitted to the differential case 21. As a result, the drive torque distribution ratio between the left and right rear wheels 6L, 6R can be controlled.

According to the driving force distribution device 10 described above, the following operational effects are obtained. Specifically, in the driving force distribution device 10, left-right wheel torque difference control can be performed by using a differential mechanism part of an existing final reduction device. In other words, control can be performed for making the drive torque transmitted to the rear wheel 6L (6R) greater than the drive torque transmitted to the other rear wheel 6R (6L) by bringing only the clutch mechanism 40L (40R) into the engaged state. As a result, the yaw moment around the center of gravity of the vehicle 1 can be controlled in accordance with the traveling condition of the vehicle 1 and the road surface condition.

For example, when the vehicle 1 turns left, a greater drive torque can be transmitted to the right rear wheel 6R being an outer wheel than to the left rear wheel 6L being an inner wheel, by bringing only the right clutch mechanism 40R into engagement. As a result, the yaw moment for assisting in the left turning motion of the vehicle 1 can be increased to prevent the vehicle 1 from understeering, by increasing the drive torque transmitted to the right rear wheel 6R and reducing the drive torque transmitted to the left rear wheel 6L. In this case, since the drive torque distribution ratio between the left and right rear wheels 6L, 6R can be controlled by controlling the engagement capacity of the clutch mechanism 40R, the increased amount of the yaw moment for assisting in the left turning motion of the vehicle 1 can be set depending on the understeer condition. Similarly, the vehicle 1 can be prevented from understeering when the vehicle 1 turns right. In this manner, the understeering tendency can be reduced to improve the turning performance of the vehicle 1, by increasing the drive torque to be transmitted to the outside drive wheel upon turning of the vehicle 1.

On the contrary, when the vehicle 1 turns left, a greater drive torque can be transmitted to the left rear wheel 6L being an inner wheel than to the right rear wheel 6R being an outer wheel, by bringing only the left clutch mechanism 40L into engagement. As a result, the yaw moment for assisting in the left turning motion of the vehicle 1 can be reduced to prevent the vehicle 1 from oversteering, by increasing the drive torque transmitted to the left rear wheel 6L and reducing the drive torque transmitted to the right rear wheel 6R. In this case, since the drive torque distribution ratio between the left and right rear wheels 6L, 6R can be controlled by controlling the engagement capacity of the clutch mechanism 40L, the reduced amount of the yaw moment for assisting in the left turning motion of the vehicle 1 can be set depending on the oversteer condition. Similarly, the vehicle 1 can be prevented from oversteering when the vehicle 1 turns right. In this manner, the oversteering tendency can be reduced to improve the safe performance of the vehicle 1, by increasing the drive torque to be transmitted to the inside drive wheel upon turning of the vehicle 1.

It is effective to perform the left-right wheel torque difference control in accordance with the road surface condition at any time besides when the vehicle 1 turns left or right. For example, in the case where the friction coefficient μ varies between a road surface and the left or right rear wheels 6L, 6R at startup or during straight traveling of the vehicle 1, it is preferred that the left-right wheel torque difference control. Specifically, when the friction coefficient μ between the rear wheel 6L (6R) and the road surface is greater than the friction coefficient μ of the other rear wheel 6R (6L), only the clutch mechanism 40L (40R) is brought into the engaged state to make the drive torque transmitted to the rear wheel 6L (6R) greater than the drive torque transmitted to the other rear wheel 6R (6L). As a result, greater drive torque can be distributed to the rear wheel 6L (6R) in which the friction coefficient μ does not easily make a significant slip, compared to the other rear wheel 6R (6L) in which the friction coefficient μ easily makes a small slip. Therefore, the starting performance and straight traveling performance of the vehicle 1 can be improved, which means that the left-right wheel torque difference control is effective especially at startup where a great drive torque is required.

On the other hand, when the above left-right wheel torque difference control does not have to be performed, the left and right clutch mechanisms 40L, 40R may be brought into the disengaged state in the driving force distribution device 10.

Here, the differential mechanism of the differential mechanism part 20 can perform the left-right wheel torque difference control regardless of whether the differential mechanism is of, for example, a beveled gear type, helical gear type, mechanical LSD (Limited Slip Differential) type, or other type. The speed-up mechanisms 30L, 30R may also have any configuration. Therefore, cost reduction can be achieved and a structure for supporting the speed-up mechanisms 30L, 30R can be simplified because the speed-up mechanisms 30L, 30R can be each configured using external gears of simple construction, such as helical gears and spur gears. As a result, reduction in size of the driving force distribution device 10 and size of the housing 11 thereof can be achieved. Note that it is not necessary to use the abovementioned gears in the speed-up mechanisms 30L, 30R as long as they can transmit power between the two shafts, and thus they can be configured using a combination of a chain and a sprocket, a combination of a belt and a pulley, or the like.

Separating the intermediate shafts 33L, 33R into the left and right sides can contribute to reduction of the size of the driving force distribution device 10 and the size of the housing 11 thereof. Specifically, unlike the related art described above (see Japanese Patent No. 2641724), the intermediate driving shafts 33La, 33Lb can be disposed highly flexibly because the intermediate shafts 33L, 33R, i.e., the intermediate driving shaft 33La of the left speed-up mechanism 30L and the intermediate driving shaft 33Ra of the right speed-up mechanism 30R, are provided separately. Accordingly, the size of the driving force distribution device 10 and the size of the housing 11 surrounding this driving force distribution device 10 can be reduced. As a result, the increase in weight of the driving force distribution device 10 and the deterioration in mountability can be prevented.

For example, when the intermediate driving shafts 33La, 33Ra are integrated, they might interfere with the input shaft 23 (or the propeller shaft 4), which makes it difficult to dispose the intermediate driving shafts 33La, 33Ra in front of the output shafts 24L, 24R. However, separating the intermediate driving shafts 33La, 33Ra into the left and right sides forms a space therebetween so that the input shaft 23 can be disposed in the space. Therefore, the intermediate driving shafts 33La, 33Ra can be disposed in front of the output shafts 24L, 24R. As a result, the lengths of the longitudinal directions of the driving force distribution device 10 and of the housing 11 thereof can be reduced and the size of the driving force distribution device 10 and the size of the housing 11 thereof can be reduced.

Figure 3:
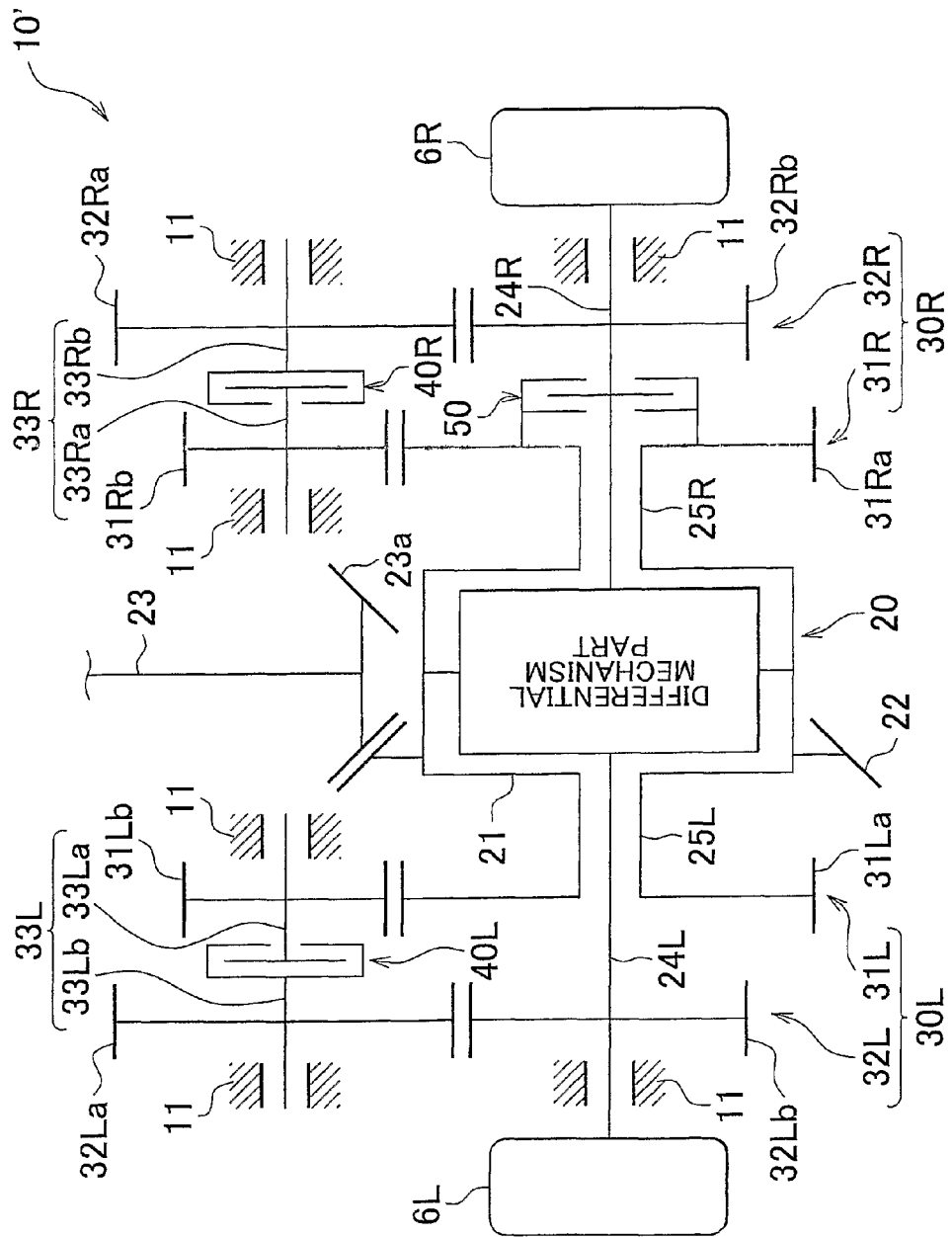
FIG. 3 is a skeleton diagram showing a modification of the driving force distribution mechanism shown in FIG. 2.

Next, main modifications of this embodiment are described. A driving force distribution device 10' shown in FIG. 3 is configured by adding an LSD clutch mechanism 50 to the driving force distribution device 10 shown in FIG. 2. The driving force distribution device 10', therefore, has the differential mechanism part 20, the left and right speed-up mechanisms 30L, 30R, the left and right clutch mechanisms 40L, 40R, and the LSD clutch mechanism 50. Note that the same reference numerals are assigned to the same members as those shown in FIG. 2, and the descriptions of these members are omitted.

As shown in FIG. 3, the LSD clutch mechanism 50, which is disposed to the right side of the differential mechanism part 20, performs differential limiting control for limiting the differential operation performed by the differential mechanism part 20. The LSD clutch mechanism 50 interposed between the output shaft 24R extending rightward from the differential mechanism of the differential mechanism part 20 and the hollow shaft 25R extending rightward from the differential case 21.

The positional relationship between the LSD clutch mechanism 50 and the right clutch mechanism 40R is established as follows. Specifically, the LSD clutch mechanism 50 is disposed in a position where it overlaps with the right clutch mechanism 40R, as viewed from a direction along the longitudinal direction of the vehicle 1. In other words, the clutch mechanism 40R and the LSD clutch mechanism 50 are arranged longitudinally.

The LSD clutch mechanism 50 may have any configuration as long as it can control differential limiting force (clutch engaging force) that is generated between the output shaft 24R and the hollow shaft 25R. The clutch mechanisms 40L, 40R can have the same configuration, and, for example, a hydraulic clutch can be used as the LSD clutch mechanism 50. When the LSD clutch mechanism 50 is a hydraulic clutch, engagement/disengagement control is carried out based on hydraulic control performed through a hydraulic circuit or the like. Moreover, electrically controlled coupling or the like may be used as the LSD clutch mechanism 50.

Specifically, when the LSD clutch mechanism 50 enters the disengaged state, the differential limiting force is not generated between the output shaft 24R and the hollow shaft 25R. At this moment, a differential limiting operation is not performed. Note that the LSD clutch mechanism 50 is brought into the disengaged stated when the abovementioned left-right torque difference control is performed while bringing one of the clutch mechanisms 40L, 40R into the engaged state.

On the other hand, when the LSD clutch mechanism 50 enters the engaged state, the differential limiting force is generated between the output shaft 24R and the hollow shaft 25R. Then, the differential limiting operation is performed in which the right rear wheel 6R coupled to the output shaft 24R and the differential case 21 integrated with the hollow shaft 25R are rotated at the same speed by means of this differential limiting force, to limit the differential rotation of the left and right rear wheels 6L, 6R. Then, upon engagement of the LSD clutch mechanism 50, the differential limiting force is adjusted by controlling the level of engagement (engagement capacity) of the LSD clutch mechanism 50. In other words, the differential limiting force can be set arbitrarily by controlling the LSD clutch mechanism 50 between the engaged state and the disengaged state. For example, when the LSD clutch mechanism 50 is a hydraulic clutch, the engagement capacity thereof is subjected to hydraulic control.

According to this driving force distribution device 10', not only can the operational effects same as those of the driving force distribution device 10 be obtained, but also the differential limiting control can be performed by the LSD clutch mechanism 50. Specifically, by bringing both the left and right clutch mechanisms 40L, 40R into the disengaged state and bringing the LSD clutch mechanism 50 into the engaged state, the differential operation performed by the differential mechanism part 20 can be limited by the differential limiting force generated between the output shaft 24R and the hollow shaft 25R, and the left and right rear wheels 6L, 6R are rotated at the same rotation speed. In this case, because the differential limiting force can be set arbitrarily by controlling the engagement capacity of the LSD clutch mechanism 50, the differential limiting force required in the differential limiting operation can be secured easily.

Moreover, because the LSD clutch mechanism 50 is disposed in a position where it overlaps with the clutch mechanism 40R in the longitudinal direction, the driving force distribution device 10' and the housing 11 thereof can be prevented from being enlarged in a vehicle width direction and, as a result, the increase in weight of the driving force distribution device 10' and the deterioration in mountability can be prevented.

Note that the LSD clutch mechanism 50 may be disposed to the left side of the differential mechanism part 20. In this case, the LSD clutch mechanism 50 is interposed between the output shaft 24L extending from the differential mechanism of the differential mechanism part 20 and the hollow shaft 25L extending from the differential case 21. The LSD clutch mechanism 50 is also disposed in a position where it overlaps with the left clutch mechanism 40L, as viewed from the direction along the longitudinal direction of the vehicle 1.

Here, the positional relationship of the LSD clutch mechanism 50 to the clutch mechanisms 40L, 40R may be established as follows.

The above has described that the LSD clutch mechanism 50 is disposed in the positions where it overlaps with the clutch mechanisms 40L, 40R, as views from a direction along the longitudinal direction of the vehicle 1, but instead the LSD clutch mechanism 50 may be disposed in a position where it is offset from the clutch mechanisms 40L, 40R.

Figure 4:
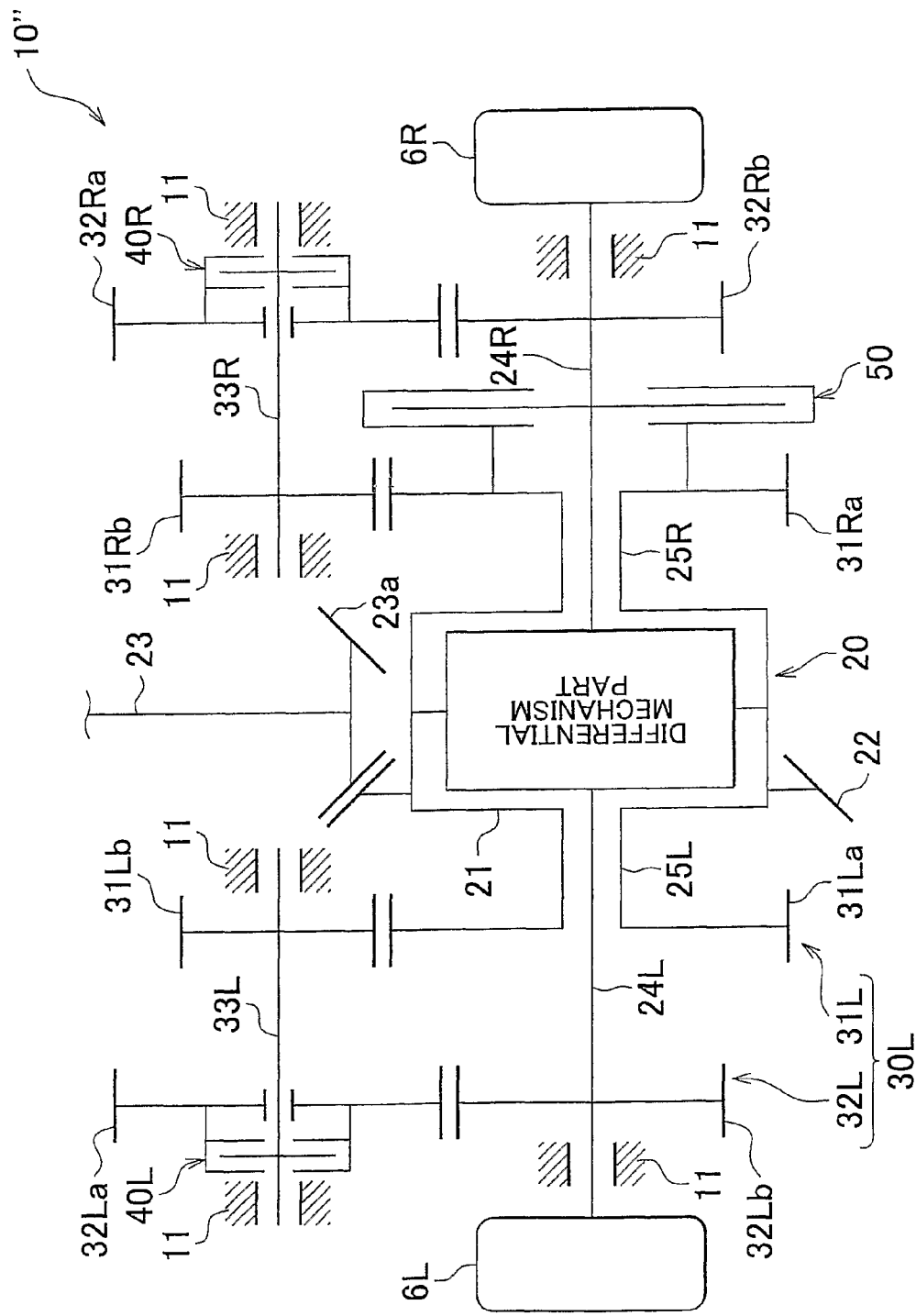
FIG. 4 is a skeleton diagram showing another modification of the driving force distribution mechanism shown in FIG. 2.

For example, in the driving force distribution device 10" shown in FIG. 4, the LSD clutch mechanism 50 is disposed to the right side of the differential mechanism part 20 and also provided in a position where it is offset from the right clutch mechanism 40R, as viewed from the direction along the longitudinal direction of the vehicle 1. Therefore, the clutch mechanism 40R and the LSD clutch mechanism 50 do not overlap with each other as viewed from the direction along the longitudinal direction of the vehicle 1. In the driving force distribution device 10" shown in FIG. 4, the LSD clutch mechanism 50 is larger than that of the driving force distribution device 10' shown in FIG. 3. The larger the LSD clutch mechanism 50, the greater the engagement capacity of the LSD clutch mechanism 50 can be secured. Note in the driving force distribution device 10" shown in FIG. 4 that the left and right intermediate shafts 33L, 33R are not divided but integrated, and the left clutch mechanism 40L is provided at the left end of the left intermediate shaft 33L and the right clutch mechanism 40R at the right end of the right intermediate shaft 33R.

In the driving force distribution device 10", because a larger size of the LSD clutch mechanism 50 can be installed, a larger engagement capacity of the LSD clutch mechanism 50 can be secured easily and, as a result, a larger differential limiting force can be secured easily. Although not shown, the LSD clutch mechanism 50 may be disposed to the left side of the differential mechanism part 20. In this case, the LSD clutch mechanism 50 is disposed in a position where it is offset from the left clutch mechanism 40L, as viewed from the direction along the longitudinal direction of the vehicle 1.

Figure 5:
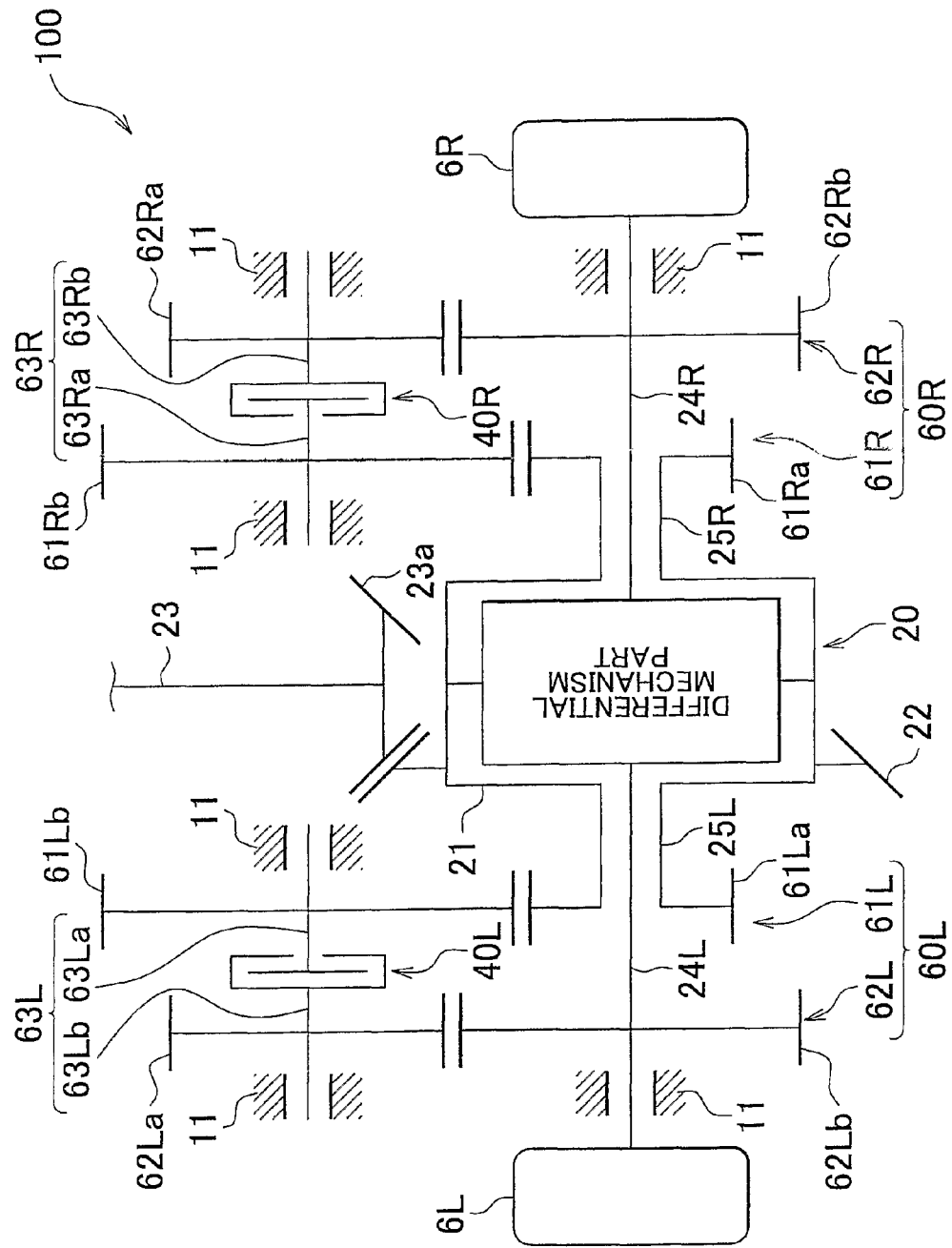
FIG. 5 is a skeleton diagram showing a driving force distribution mechanism according to another embodiment.

Another embodiment is described next with reference to FIG. 5. A driving force distribution device 100 shown in FIG. 5 is configured substantially the same as the driving force distribution device 10 shown in FIG. 2, except for that the driving force distribution device 100 has left and right reduction mechanisms 60L, 60R in place of the left and right speed-up mechanisms 30L, 30R of the driving force distribution device 10 shown in FIG. 2. Specifically, this embodiment is different from the above embodiment in that this embodiment employs the reduction mechanisms as the transmission mechanisms, in place of the speed-up mechanisms. Therefore, the driving force distribution device 100 has the differential mechanism part 20, the left and right reduction mechanisms 60L, 60R, and the left and right clutch mechanisms 40L, 40R. Note that the same reference numerals are assigned to the same members as those shown in FIG. 2, and the descriptions of these members are omitted.

As shown in FIG. 5, the left and right reduction mechanisms 60L, 60R are disposed on both right and left sides of the differential mechanism part 20. The left and right reduction mechanisms 60L, 60R have the same configuration. Here, the left reduction mechanism 60L is mainly described but the description of the right reduction mechanism 60R is omitted. The reduction mechanism 60L has a pair of reduction gear trains 61L, 62L for transmitting the driving force from the differential case 21 to the output shaft 24L via an intermediate shaft 63L.

The reduction gear train 61L is configured by a drive gear 61La and a driven gear 61Lb that are meshed with each other. The drive gear 61La has a smaller diameter than the driven gear 61Lb and a gear ratio of the reduction gear train 61L (the number of teeth of the drive gear 61La/the number of teeth of the driven gear 61Lb) is set lower than 1. With this reduction gear train 61L, the driving force is transmitted from the differential case 21 at a predetermined reduction ratio (gear ratio) upon engagement of the clutch mechanism 40L.

The reduction gear train 62L is configured by a drive gear 62La and a driven gear 62Lb that are meshed with each other. The drive gear 62La has a smaller diameter than the driven gear 62Lb and a gear ratio of the reduction gear train 62L (the number of teeth of the drive gear 62La/the number of teeth of the driven gear 62Lb) is set lower than 1. With this reduction gear train 62L, the driving force is transmitted from the reduction gear train 61L at a predetermined reduction ratio (gear ratio) upon engagement of the clutch mechanism 40L.

The drive gear 61La of the reduction gear train 61L is provided above the hollow shaft 25L. The driven gear 62Lb of the reduction gear train 62L is provided above the output shaft 24L. The driven gear 61Lb of the reduction gear train 61L and the drive gear 62La of the reduction gear train 62L are provided above the intermediate shaft (countershaft) 63L extending parallel to the output shaft 24L (hollow shaft 25L). The intermediate shaft 63L is disposed in front of the output shaft 24L.

In this embodiment, the intermediate shaft 63L is divided into an intermediate driving shaft 63La and an intermediate driven shaft 63Lb. The driven gear 61Lb of the reduction gear train 61L is provided above the intermediate driving shaft 63La, while the drive gear 62La of the reduction gear train 62L is provided above the intermediate driven shaft 63Lb. A right end of the intermediate driving shaft 63La and a left end of the intermediate driven shaft 63Lb are supported rotatably in the housing 11 via bearings, not shown. Also, the clutch mechanism 40L is interposed between a left end of the intermediate driving shaft 63La and a right end of the intermediate driven shaft 63Lb.

The operations of the driving force distribution device 100 are described next. In the case where the clutch mechanisms 40L, 40R are both in the disengaged state, the driving force distribution device 100 distributes the driving force evenly to the left and right rear wheels 6L, 6R. The operations of the driving force distribution device 100 in this case are the same as those of the above embodiment.

When the clutch mechanism 40L is in the engaged state and the clutch mechanism 40R in the disengaged state, the engagement of the clutch mechanism 40L brings the reduction mechanism 60L into the transmitting state, thereby reducing the rotation speed of the output shaft 24L. In this case, contrary to the above embodiment, the drive torque to be transmitted to the rear wheel 6L is reduced. Also, in this case, the drive torque to be transmitted to the rear wheel 6R is increased by the reduced amount of drive torque to be transmitted to the rear wheel 6L. In other words, contrary to the above embodiment, the drive torque to be transmitted to the rear wheel 6R can be incremented, by bringing the clutch mechanism 40L into the engaged state.

Therefore, a greater drive torque can be transmitted to the right rear wheel 6R than to the left rear wheel 6L by bringing the clutch mechanism 40L into engagement. The drive torque that is added to the drive torque of the rear wheel 6R can be set arbitrarily by controlling the engagement capacity of the clutch mechanism 40L, regardless of the magnitude of input torque transmitted to the differential case 21. Specifically, the drive torque to be added to the drive torque of the rear wheel 6R can be adjusted by appropriately setting the engagement capacity of the clutch mechanism 40L between the disengaged state (in which the level of engagement is 0%) and a completely engaged state (in which the level of engagement is 100%). As a result, the drive torque distribution ratio between the left and right rear wheels 6L, 6R can be controlled.

Similarly, when the clutch mechanism 40R is in the engaged state and the clutch mechanism 40L in the disengaged state, contrary to the above embodiment, the drive torque to be transmitted to the rear wheel 6L is incremented in response to the engagement of the clutch mechanism 40R. Furthermore, the drive torque to be transmitted to the rear wheel 6R is reduced by the amount of drive torque added to the rear wheel 6L. Specifically, a greater drive torque can be transmitted to the left rear wheel 6L than to the right rear wheel 6R by bringing the clutch mechanism 40R into engagement. Then, the drive torque that is added to the drive torque of the rear wheel 6L can be set arbitrarily by controlling the engagement capacity of the clutch mechanism 40R, regardless of the magnitude of input torque transmitted to the differential case 21. As a result, the drive torque distribution ratio between the left and right rear wheels 6L, 6R can be controlled.

According to this driving force distribution device 100 as well, the same operational effects as those obtainable from the driving force distribution device 10 can be obtained.

Here, in the driving force distribution device 100, left-right wheel torque difference control can be performed by using a differential mechanism part of an existing final reduction device, but this left-right wheel torque difference control is opposite of the one described in the above embodiment. Specifically, control can be performed for making the drive torque transmitted to the rear wheel 6R (6L) greater than the drive torque transmitted to the other rear wheel 6L (6R) by bringing only the clutch mechanism 40L (40R) into the engaged state. As a result, the yaw moment around the center of gravity of the vehicle 1 can be controlled in accordance with the traveling condition of the vehicle 1 and the road surface condition. Note that it is not necessary to use the abovementioned gears in the reduction mechanisms 60L, 60R as long as they can transmit power between the two shafts, and thus they can be configured using a combination of a chain and a sprocket, a combination of a belt and a pulley, or the like.

Figure 6:
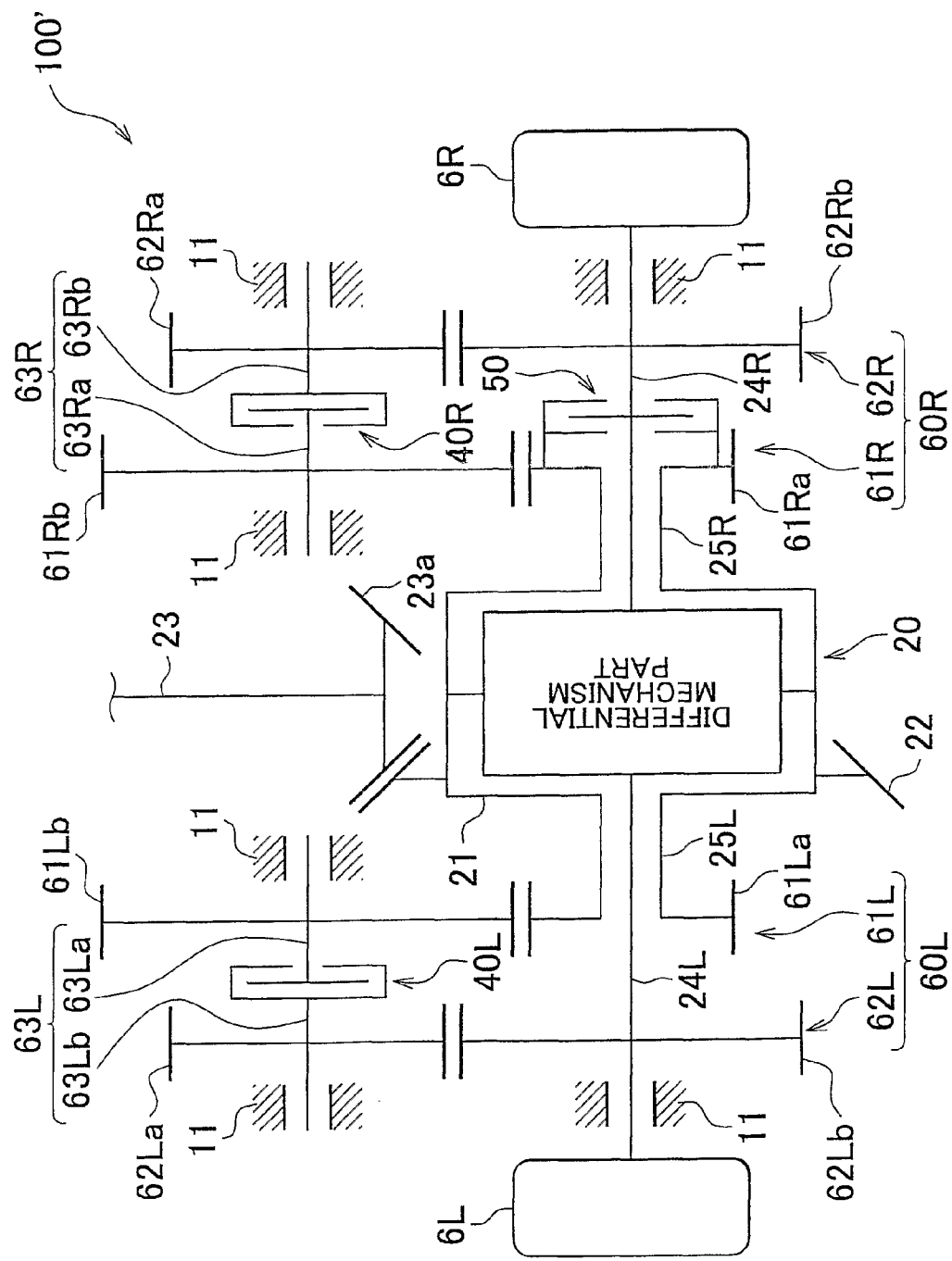
FIG. 6 is a skeleton diagram showing a modification of the driving force distribution mechanism shown in FIG. 5.
Figure 7:
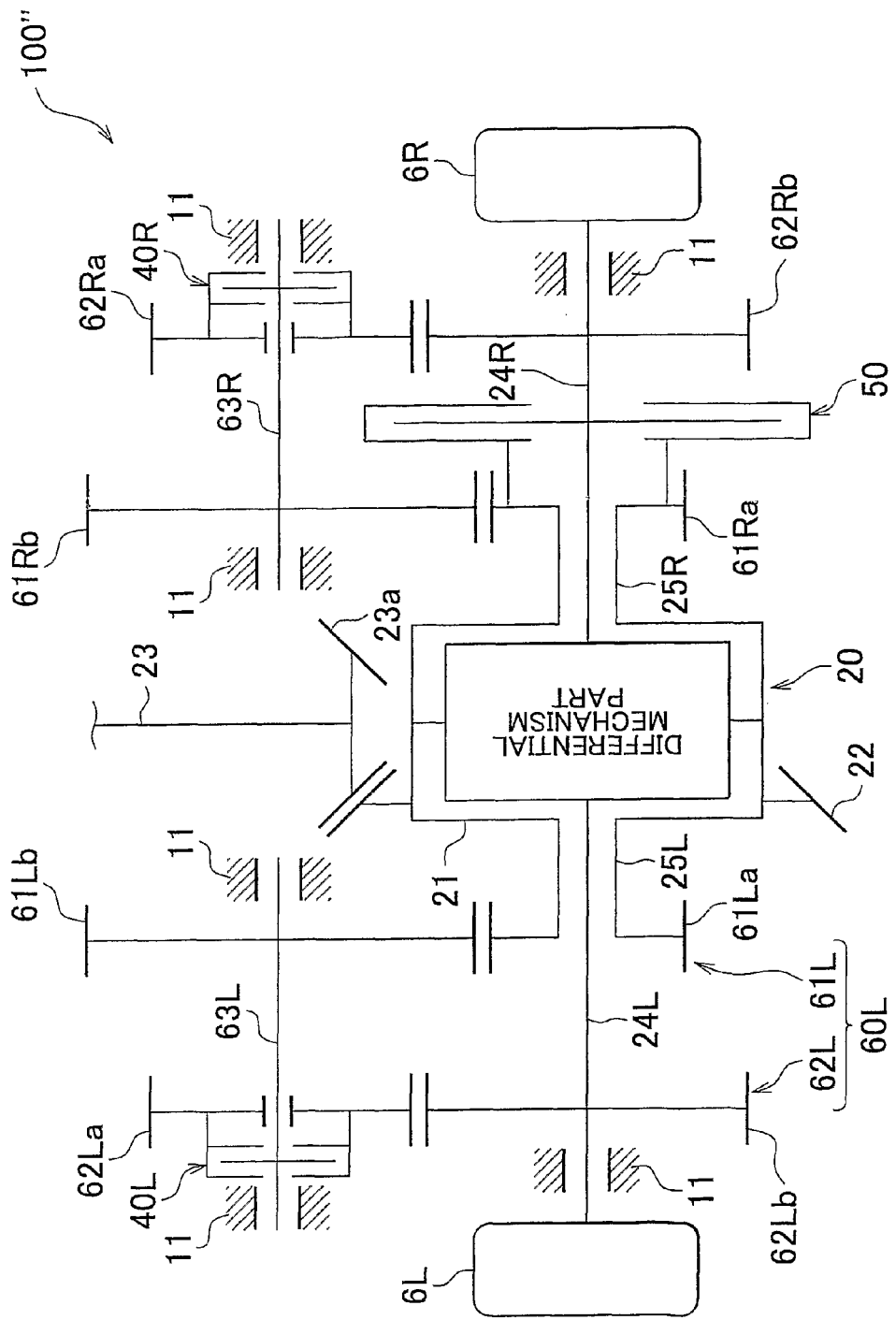
FIG. 7 is a skeleton diagram showing another modification of the driving force distribution mechanism shown in FIG. 5.

In this embodiment as well, the same modification as the one for the above embodiment is considered. This modification is shown in FIGS. 6 and 7. The difference between a driving force distribution device 100' shown in FIG. 6 and a driving force distribution device 100" shown in FIG. 7 is the positional relationship between the LSD clutch mechanism 50 and the clutch mechanisms 40L, 40R, but the rest of the configurations of both devices are the same.

The driving force distribution device 100' shown in FIG. 6 is configured by adding the LSD clutch mechanism 50 shown in FIG. 3 to the driving force distribution device 100 shown in FIG. 5. The driving force distribution device 100', therefore, has the differential mechanism part 20, the left and right reduction mechanisms 60L, 60R, the left and right clutch mechanisms 40L, 40R, and the LSD clutch mechanism 50. In the driving force distribution device 100' shown in FIG. 6, the positional relationship between the LSD clutch mechanism 50 and the clutch mechanism 40R (40L) is the same as that of the driving force distribution device 10' shown in FIG. 3, wherein the LSD clutch mechanism 50 is disposed in the position where it overlaps with the clutch mechanism 40R (40L), as viewed from the direction along the longitudinal direction of the vehicle 1.

On the other hand, in the driving force distribution device 100" shown in FIG. 7, the positional relationship between the LSD clutch mechanism 50 and the clutch mechanism 40R (40L) is the same as that of the driving force distribution device 10" shown in FIG. 4, wherein the LSD clutch mechanism 50 is disposed in the position where it is offset from the clutch mechanism 40R (40L), as viewed from the direction along the longitudinal direction of the vehicle 1.

Note that the above embodiments have explained the examples in which this invention is applied to a FR vehicle in which the engine and transmission are disposed along the longitudinal direction of a vehicle, but this invention is not limited to these embodiments. Therefore, this invention can be applied to a FF vehicle (front-engine front-drive vehicle) in which the engine and transmission are horizontally laid along the lateral direction of a vehicle. This invention can also be applied to a four-wheel-drive vehicle. Note that in a FF vehicle or a four-wheel-drive vehicle, the driving force distribution device may be built into a housing that surrounds a transmission.

The invention claimed is:

1. A driving force distribution mechanism for distributing driving force from a driving source to left and right driving wheels, comprising:
   a differential case which accommodates a differential mechanism therein;
   a first intermediate shaft which is provided parallel to a left output shaft extending leftward from the differential mechanism;
   a first transmission mechanism which is provided to the left of the differential case and changes and transmits driving force input to the differential case to the left output shaft via the first intermediate shaft;
   a first clutch mechanism which is capable of switching between a transmitting state in which the first transmission mechanism transmits the driving force to the left output shaft and a blocking state in which the transmission of the driving force is blocked;
   a second intermediate shaft which is provided parallel to a right output shaft extending rightward from the differential mechanism;
   a second transmission mechanism which is provided to the right of the differential case and changes and transmits the driving force input to the differential case to the right output shaft via the second intermediate shaft;
   a second clutch mechanism which is capable of switching between a transmitting state in which the second transmission mechanism transmits the driving force to the right output shaft and a blocking state in which the transmission of the driving force is blocked, and
   a differential limiting mechanism which is provided in at least either one of the left output shaft and the right output shaft and engaged with the differential case,
   wherein the differential limiting mechanism is disposed in a position where the differential limiting mechanism overlaps with the first clutch mechanism or the second clutch mechanism, as viewed from a direction along a longitudinal direction of a vehicle.

2. The driving force distribution mechanism according to claim 1, wherein
   the first intermediate shaft is configured by a first intermediate driving shaft and a first intermediate driven shaft,
   the first clutch mechanism is disposed between the first intermediate driving shaft and the first intermediate driven shaft,
   the second intermediate shaft is configured by a second intermediate driving shaft and a second intermediate driven shaft, and that
   the second clutch mechanism is disposed between the second intermediate driving shaft and the second intermediate driven shaft.

3. The driving force distribution, mechanism according to claim 2, wherein
   the first transmission mechanism is configured by a speed-up mechanism which transmits the driving force from the differential case to the left output shaft via the first intermediate shaft, and that the second transmission mechanism is configured by a speed-up mechanism which transmits the driving force from the differential case to the right output shaft via the second intermediate shaft.

4. The driving force distribution mechanism according to claim 2, wherein
   the first transmission mechanism is configured by a reduction mechanism which transmits the driving force from the differential case to the left output shaft via the first intermediate shaft, and that the second transmission mechanism is configured by a reduction mechanism which transmits the driving force from the differential case to the right output shaft via the second intermediate shaft.

5. The driving force distribution mechanism according to claim 1, wherein
   the first intermediate shaft is an integrated shaft, an end of which is disposed with the first clutch mechanism, and that the second intermediate shaft is an integrated shaft, an end of which is disposed with the second clutch mechanism.

6. The driving force distribution mechanism according to claim 5, wherein
   the first transmission mechanism is configured by a speed-up mechanism which transmits the driving force from the differential case to the left output shaft via the first intermediate shaft, and that the second transmission mechanism is configured by a speed-up mechanism which transmits the driving force from the differential case to the right output shaft via the second intermediate shaft.

7. The driving force distribution mechanism according to claim 5, wherein
   the first transmission mechanism is configured by a reduction mechanism which transmits the driving force from the differential case to the left output shaft via the first intermediate shaft, and that the second transmission mechanism is configured by a reduction mechanism which transmits the driving force from the differential case to the right output shaft via the second intermediate shaft.

8. The driving force distribution mechanism according to claim 1, wherein
   the first transmission mechanism is configured by a speed-up mechanism which transmits the driving force from the differential case to the left output shaft via the first intermediate shaft, and that the second transmission mechanism is configured by a speed-up mechanism which transmits the driving force from the differential case to the right output shaft via the second intermediate shaft.

9. The driving force distribution mechanism according to claim 1, wherein
   the first transmission mechanism is configured by a reduction mechanism which transmits the driving force from the differential case to the left output shaft via the first intermediate shaft, and that the second transmission mechanism is configured by a reduction mechanism which transmits the driving force from the differential case to the right output shaft via the second intermediate shaft.

10. The driving force distribution mechanism according to claim 1, wherein
    the first transmission mechanism is configured by a speed-up mechanism which transmits the driving force from the differential case to the left output shaft via the first intermediate shaft, and that the second transmission mechanism is configured by a speed-up mechanism which transmits the driving force from the differential case to the right output shaft via the second intermediate shaft.

11. The driving force distribution mechanism according to claim 1, wherein
    the first transmission mechanism is configured by a reduction mechanism which transmits the driving force from the differential case to the left output shaft via the first intermediate shaft, and that the second transmission mechanism is configured by a reduction mechanism which transmits the driving force from the differential case to the right output shaft via the second intermediate shaft.

12. A driving force distribution mechanism for distributing driving force from a driving source to left and right driving wheels, comprising:
- a differential case which accommodates a differential mechanism therein;
- a first intermediate shaft which is provided parallel to a left output shaft extending leftward from the differential mechanism;
- a first transmission mechanism which is provided to the left of the differential case and changes and transmits driving force input to the differential case to the left output shaft via the first intermediate shaft;
- a first clutch mechanism which is capable of switching between a transmitting state in which the first transmission mechanism transmits the driving force to the left output shaft and a blocking state in which the transmission of the driving force is blocked;
- a second intermediate shaft which is provided parallel to a right output shaft extending rightward from the differential mechanism;
- a second transmission mechanism which is provided to the right of the differential case and changes and transmits the driving force input to the differential case to the right output shaft via the second intermediate shaft;
- a second clutch mechanism which is capable of switching between a transmitting state in which the second transmission mechanism transmits the driving force to the right output shaft and a blocking state in which the transmission of the driving force is blocked, and
- a differential limiting mechanism which is provided in at least either one of the left output shaft and the right output shaft and engaged with the differential case,
- wherein the differential limiting mechanism is disposed to the outside of the differential case, in a position where the differential limiting mechanism is offset from the first clutch mechanism and the second clutch mechanism, as viewed from a direction along a longitudinal direction of a vehicle.

13. The driving force distribution mechanism according to claim 12, wherein
the first transmission mechanism is configured by a speed-up mechanism which transmits the driving force from the differential case to the left output shaft via the first intermediate shaft, and that the second transmission mechanism is configured by a speed-up mechanism which transmits the driving force from the differential case to the right output shaft via the second intermediate shaft.

14. The driving force distribution mechanism according to claim 12, wherein
the first transmission mechanism is configured by a reduction mechanism which transmits the driving force from the differential case to the left output shaft via the first intermediate shaft, and that the second transmission mechanism is configured by a reduction mechanism which transmits the driving force from the differential case to the right output shaft via the second intermediate shaft.

* * * * *